J. H., W. & T. D. MORRIS.
Animal-Trap.
No. 225,628.  Patented Mar. 16, 1880.
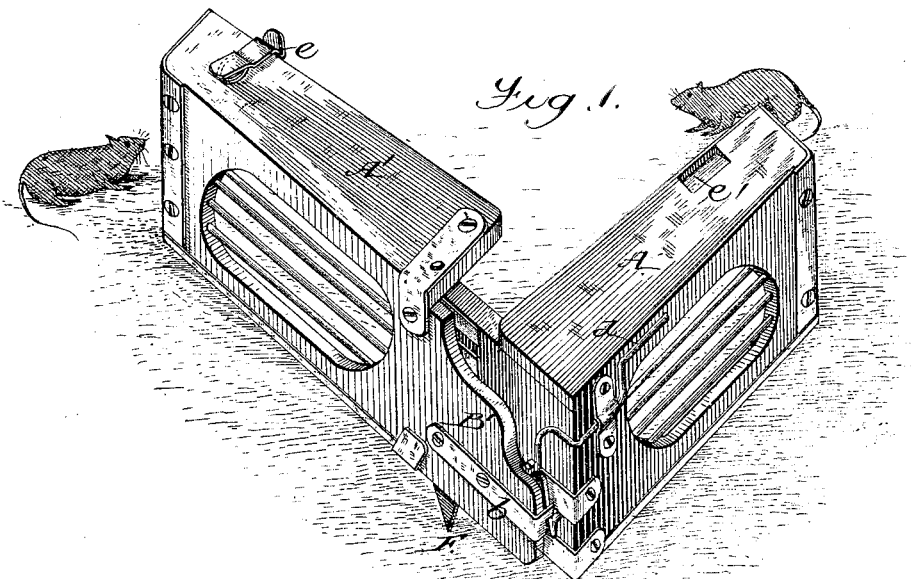
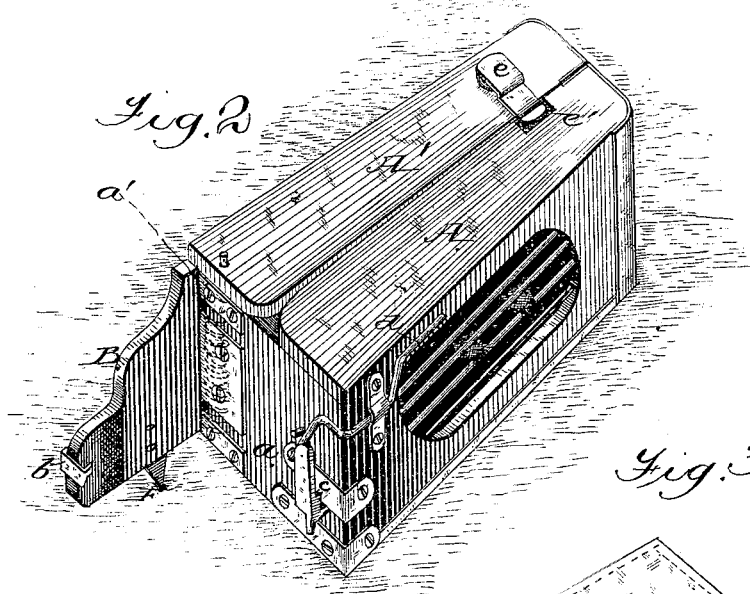
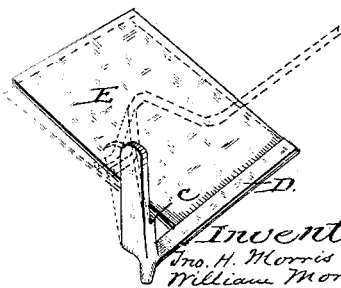
Attest:
P. Walter Fowler
W. H. Morsell
Inventors
Jno. H. Morris
William Morris
Thos. D. Morris
by A. H. Evans & Co
Attorneys

UNITED STATES PATENT OFFICE.

JOHN H. MORRIS, WILLIAM MORRIS, AND THOMAS D. MORRIS, OF SEWARD, NEBRASKA.

ANIMAL-TRAP.

SPECIFICATION forming part of Letters Patent No. 225,628, dated March 16, 1880.

Application filed January 13, 1880.

*To all whom it may concern:*

Be it known that we, JOHN H. MORRIS, WILLIAM MORRIS, and THOMAS D. MORRIS, of Seward, Nebraska, have invented a new and Improved Animal-Trap, of which the following is a clear, full, and exact description, reference being had to the accompanying drawings, making a part of this specification, in which—

Figure 1 is a perspective view of our trap set for animals. Fig. 2 is a perspective view of same sprung. Fig. 3 is a detail view, showing the mechanism for setting and springing the trap.

Our invention relates to that class of animal-traps which catch the animal by sudden imprisonment; and it consists of the combination of devices hereinafter described and claimed.

In order to enable others to make and use our invention, we will proceed to describe the exact manner in which we have carried it out.

In the drawings, A and A' represent the two parts or jaws of the trap which imprison the animal. The rear end of A is closed by the extended plate $a$, to which it is rigidly attached. The plate $a$ extends sufficiently in length to form the rear end of the part A' when the trap is sprung or closed, as shown in Fig. 2. On the outer end of $a$ is pivoted the jaw A', which is provided with a coil or suitable spring for throwing together the jaws when the trap is sprung. The jaw A' has an extended back, B, on which is secured the catch $b$, by which the trap is set when the jaws are opened, as shown in Fig. 1, the catch engaging with the latch, and the latch can be moved by means of the crank-lever $d$ on the outer end of the treadle-bar D. Attached to the treadle-bar rigidly is the platform or treadle E, which stands out horizontal when the trap is set, and which, on being pressed down by the weight of the animal, partially revolves the treadle-bar and releases the latch, when the spring $a'$ causes the two parts or jaws A A' to move horizontally toward each other and imprison the animal, as shown in Fig. 2.

Below the extended back B we attach a sharp metal point, F, to rest on the floor or ground where the trap may be used. This point has a tendency to act as a pivot on which the jaw A' turns, and as the pivotal point of the jaw A is thus thrown forward the whole trap is caused to spring forward with a jump as the jaws come together, and thus renders the escape of the animal much more difficult.

On the jaw A' may be secured a spring-latch, $e$, engaging with a corresponding catch, $e'$, on the jaw A, whereby the jaws are held securely together when once sprung.

Having thus explained our invention, what we claim as new, and desire to secure by Letters Patent, is—

In an animal-trap, the jaw A, with its extended back plate, $a$, and treadle E, in combination with the jaw A', with its extended back B, provided with the latch $b$, substantially as and for the purpose set forth.

JOHN H. MORRIS.
WILLIAM MORRIS.
THOS. D. MORRIS.

Witnesses:
T. L. McLEAN,
S. R. DOUGLASS.